Patented May 4, 1954

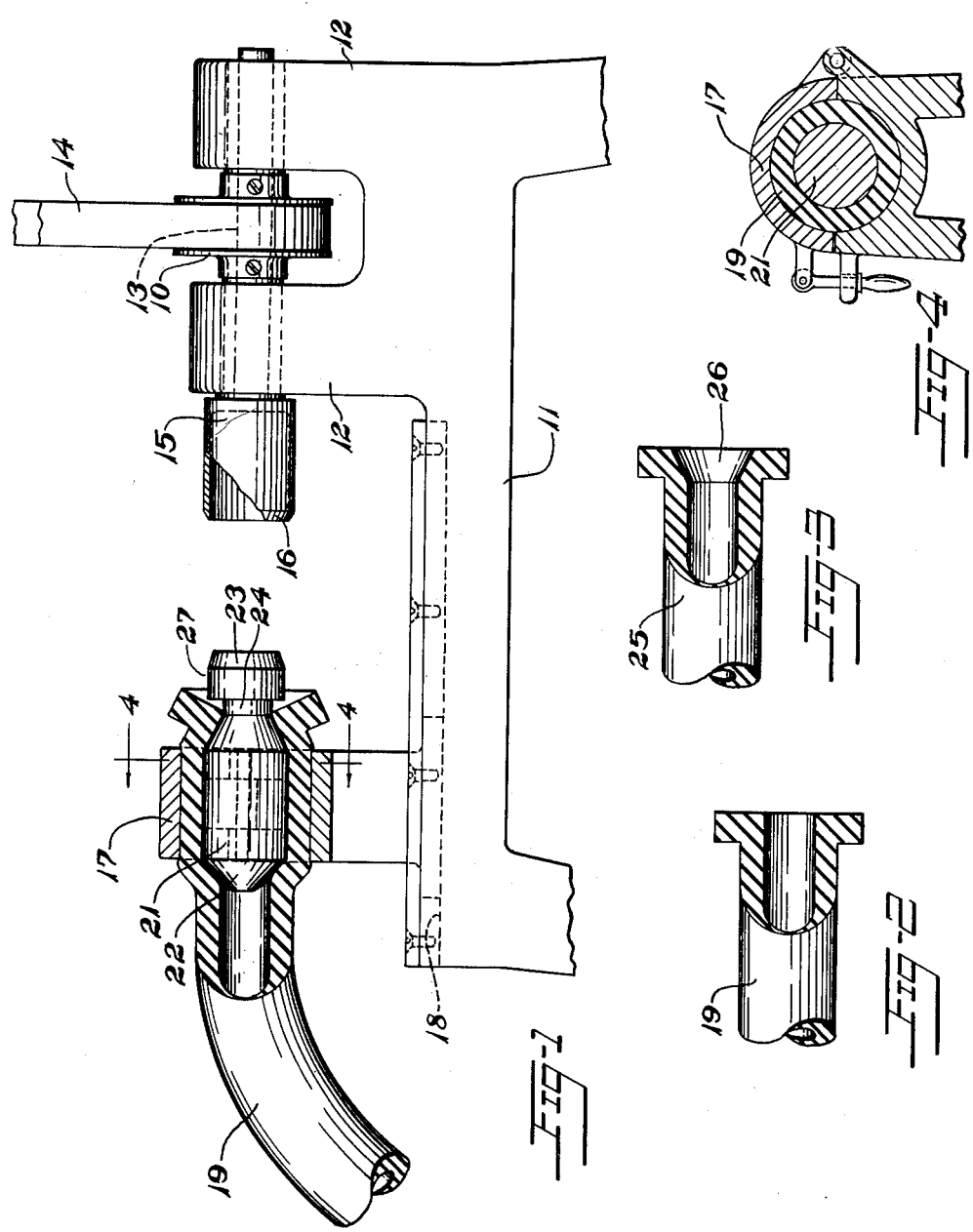

2,677,424

UNITED STATES PATENT OFFICE 2,677,424

APPARATUS FOR FORMING INNER BEVELS IN EXPANSIBLE TUBES

Robert E. Schornstheimer, Marietta, Ohio, assignor to The B. F. Goodrich Company, New York, N. Y., a corporation of New York Application February 28, 1950, Serial No. 146,805

2 Claims. (Cl. 164—60)

This invention relates to forming an inner bevel or taper at the end of a piece of expansible tubing.

It is an object of this invention to provide a method and apparatus for forming such an internal bevel at the mouth of a piece of expansible tubing.

It is a further object to provide bevel cutting apparatus of simple construction which can be easily operated.

It is also an object to provide such an apparatus which makes it possible to cut the desired taper accurately and consistently.

Other objects will be apparent from the description and drawing which follow.

As an example of the invention a specific embodiment will be described, but it will be understood that this is intended solely as an illustration and not as a limitation upon the scope of the invention.

In the drawing, Fig. 1 is a side elevation, partially broken away and in section, of one embodiment of the invention;

Fig. 2 is a view in elevation partly cut away in section of the expansible tubing before treatment;

Fig. 3 is a similar view of the tubing after the bevel has been formed; and

Fig. 4 is a cross-section on line 4—4 of Fig. 1.

In Fig. 1 an assembly including a bed plate 11 and upright members 12, 12 is shown. The upright members 12, 12 contain housings for rotatable shaft 13 which is driven by a drive belt 14 passing around pulley 10 which is secured to the shaft. Secured to the shaft 13 is the cylindrical die member 15 which has a tapered cutting edge 16.

The hinged clamp 17, shown in section, is slidably mounted in the ways 18 of bed plate 11 and serves to hold the expansible, elastic tube 19 in position for the bevel cutting operation as well as to hold mandrel 21 in position within the open end of the tube 19. The mandrel 21 has a tapered portion 22 at that end of the mandrel which is inserted in the elastic tube, the smallest diameter of the tapered portion 22 being less than the inside diameter of the elastic tube 19 in order to facilitate entry into the tube. The opposite end or die and of the mandrel 21 has a guide section 27 having a diameter slightly less than the inside diameter of the die 15; thus, a sliding fit is obtained between the parts when the guide section is inserted in the die. The end of the guide section 27 has a tapered portion 23 which facilitates entry of the guide section 27 in the die 15. The diameter of the body of the mandrel 21, i. e., that part shown within the clamp in Fig. 1, is substantially greater than the normal diameter of the tube 19 and slightly greater than the diameter of the guide section 27.

Between the body of mandrel 21 and guide section 27 lies a circumferential groove 24 which is tapered to a diameter about equal that of the inside diameter of elastic tube 19. The taper of the circumferential groove 24 is such that the smallest diameter is at that end of the mandrel adapted to be inserted into cylindrical die 15.

The mandrel 21, that portion of the elastic tube 19 in the clamp 17, the cylindrical die 15 and the shaft 13 are all arranged on a common longitudinal axis as shown.

In carrying out the bevelling process tube 19 is distorted by inserting mandrel 21 therein as shown in Fig. 1 so that the mouth of the tube contracts into and seats in the circumferential groove 24, the portion of the tube adjacent the mouth having a generally conical configuration. After the mandrel 21 is placed in the tube 19, the expanded portion of the tube along with the mandrel is secured in the clamp 17.

As the cylindrical die 15 is rotated, the clamp including the tube and mandrel is moved toward the die, guide section 27 passing into the interior of die 15. As the rotating cutting edge 16 of the die 15 engages the flexible tube 19, a clean cut is made, resulting in severance of that portion of the tube which extends into the circumferential groove 24. After completion of the cutting operation, the clamp assembly is moved away from die 15 and the clamp opened. Mandrel 21 is then removed, allowing the tube to return to its original diameter, the finished tube 25 then having a generally conical inner bevel 26 at its mouth as shown in Fig. 3.

The method and apparatus of this invention may be used with any tube or hose which can be expanded beyond its normal diameter and which possesses sufficient elasticity so that it readily returns approximately to its original dimensions when the expanding force is removed. For example, the present invention is useful for bevelling elastic tubes or hose made of natural or synthetic rubber or rubber-like materials. It may be advantageous to use water or other suitable lubricating medium on the flexible tube at the point to be cut or on the cutting edge 16 of the die 15.

By suitable selection of the diameter of die 15 and mandrel 21, elastic tubing of any diameter and any wall thickness may be bevelled to any extent desired.

Obviously, tubes having no flange at the end could be treated in the same manner as is the flanged tube shown in the drawing.

Although I have disclosed specific embodiments of my invention, I do not intend to limit myself solely thereto, but to include all the obvious modifications and variations falling within the spirit and scope of the appended claims.

I claim:

1. Apparatus for cutting an inner bevel at the mouth of an elastic tube comprising a rotatable open-ended thin-walled cylindrical die having a cutting edge at its open end, a mandrel arranged on a common longitudinal axis with said die, said mandrel having a tapered portion at each end thereof to facilitate insertion of one end of said mandrel in said die and the opposite end in a tube to be cut and having a body member and a guide member with a circumferential groove disposed therebetween, the diameter of said body member being substantially greater than the inner diameter of said guide member, said cutting edge of said die having a diameter less than that of said body member and greater than that of said guide member, means for clamping said tube about said mandrel with an end of said tube seated in said circumferential groove, means for rotating said die on a longitudinal axis, and means for inserting the end of said mandrel comprising said guide member into said rotating die.

2. Apparatus for cutting an inner bevel at an end of an elastic tube comprising a cylindrical die having an open end provided with a cutting edge mounted for axial rotation, a mandrel comprising a generally cylindrical body member and a generally cylindrical guide member secured together on a common axis and spaced apart by a conical zone tapering from the diameter of said body member to a diameter substantially less than that of said guide member, the diameter of said guide member being slightly less than the inside diameter of said die and the diameter of said body member being substantially greater than the diameter of said guide member and greater than the inside diameter of said die, means for clamping said tube about said body member of said mandrel with an end of said tube constricted about said conical zone positioned between said body member and said guide member of said mandrel, said clamped assembly and said die being mounted for movement toward and from each other along a common axis to insert said guide member into said die, and means for rotating said die.

References Cited in the file of this patent

UNITED STATES PATENTS

| Number | Name | Date |
|---|---|---|
| 918,360 | Olier | Apr. 13, 1909 |
| 1,131,589 | Allen | Mar. 9, 1915 |
| 1,604,526 | McCandless | Oct. 26, 1926 |
| 1,635,710 | Falor | July 12, 1927 |
| 1,771,471 | Waner et al. | July 29, 1930 |
| 1,876,775 | Smith | Sept. 13, 1932 |
| 1,984,730 | Darling | Dec. 18, 1934 |
| 2,023,576 | Connelly | Dec. 10, 1935 |
| 2,041,818 | Connelly | May 26, 1936 |
| 2,280,883 | Beach | Apr. 28, 1942 |
| 2,293,178 | Stocker | Aug. 18, 1942 |
| 2,327,028 | Dohrenwend | Aug. 17, 1943 |
| 2,365,902 | Powers | Dec. 26, 1944 |